(12) United States Patent
Tan et al.

(10) Patent No.: US 11,244,435 B2
(45) Date of Patent: Feb. 8, 2022

(54) METHOD AND APPARATUS FOR GENERATING VEHICLE DAMAGE INFORMATION

(71) Applicant: Baidu Online Network Technology (Beijing) Co., Ltd., Beijing (CN)

(72) Inventors: Xiao Tan, Beijing (CN); Feng Zhou, Beijing (CN); Hao Sun, Beijing (CN); Errui Ding, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 107 days.

(21) Appl. No.: 16/567,351

(22) Filed: Sep. 11, 2019

(65) Prior Publication Data

US 2020/0111203 A1 Apr. 9, 2020

(30) Foreign Application Priority Data

Oct. 8, 2018 (CN) .......................... 201811169110.5

(51) Int. Cl.
*G06T 7/00* (2017.01)
*G06T 7/11* (2017.01)
(Continued)

(52) U.S. Cl.
CPC ........ *G06T 7/0002* (2013.01); *G06K 9/00671* (2013.01); *G06K 9/4604* (2013.01);
(Continued)

(58) Field of Classification Search
CPC ................. G06T 7/0002; G06T 7/11; G06T 2207/20081; G06T 2207/30248; G06T 2207/20084; G06K 9/4604; G06K 9/6268; G06K 9/00671; G06K 9/036; G06Q 40/08; G06Q 10/20
(Continued)

(56) References Cited

U.S. PATENT DOCUMENTS

2017/0293894 A1* 10/2017 Taliwal .............. G06K 9/00671
2018/0260793 A1* 9/2018 Li ............................ G06T 7/001
(Continued)

FOREIGN PATENT DOCUMENTS

CN 106600422 A * 4/2017
CN 107403424 A1 11/2017
(Continued)

*Primary Examiner* — Nay A Maung
*Assistant Examiner* — Daniella M. DiGuglielmo
(74) *Attorney, Agent, or Firm* — Nixon Peabody LLP (57) ABSTRACT

A method and an apparatus for generating vehicle damage information are provided. The method includes: acquiring a damage area image of a target vehicle; performing image segmentation on the damage area image to obtain a first suspected damage area; inputting the damage area image to a pre-trained detection model to obtain a second suspected damage area, the detection model being configured to detect a location of the suspected damage area in the image; determining a damage image feature based on the first suspected damage area and the second suspected damage area; and inputting the damage image feature to a pre-trained classification model to generate a damage type, the classification model being configured to characterize a corresponding relationship between the image feature and the damage type.

14 Claims, 5 Drawing Sheets

(51) Int. Cl.
  *G06K 9/46*     (2006.01)
  *G06K 9/62*     (2006.01)
  *G06Q 40/08*    (2012.01)
  *G06K 9/00*     (2006.01)
  *G06Q 10/00*    (2012.01)
  *G06K 9/03*     (2006.01)

(52) U.S. Cl.
  CPC ........... *G06K 9/6268* (2013.01); *G06Q 40/08* (2013.01); *G06T 7/11* (2017.01); *G06K 9/036* (2013.01); *G06Q 10/20* (2013.01); *G06T 2207/20081* (2013.01); *G06T 2207/20084* (2013.01); *G06T 2207/30248* (2013.01)

(58) Field of Classification Search
  USPC ........................................................ 382/104
  See application file for complete search history.

(56) References Cited

U.S. PATENT DOCUMENTS

2018/0293552 A1* 10/2018 Zhang ................ G06K 9/00664
2018/0293806 A1   10/2018 Zhang et al.

FOREIGN PATENT DOCUMENTS

| | | |
|---|---|---|
| CN | 107507201 A | 12/2017 |
| CN | 107862340 A | 3/2018 |
| CN | 108229497 A | 6/2018 |
| CN | 108364253 A | 8/2018 |
| CN | 108414549 A | 8/2018 |

* cited by examiner

METHOD AND APPARATUS FOR GENERATING VEHICLE DAMAGE INFORMATION

CROSS-REFERENCE TO RELATED APPLICATIONS

This application claims priority to Chinese Patent Application No. 201811169110.5, filed on Oct. 8, 2018, titled "Method and Apparatus for Generating Vehicle Damage Information," which is hereby incorporated by reference in its entirety.

TECHNICAL FIELD

Embodiments of the present disclosure relate to the field of computer technology, specifically to a method and apparatus for generating vehicle damage information.

BACKGROUND

Generally, after a vehicle traffic accident, the insurance company needs to perform a vehicle damage assessment on the accident vehicle and file accident data. Vehicle damage assessment includes a scientific and systematic damage estimation and pricing for vehicle collision repair, using vehicle damage estimation data and maintenance data, and comprehensively analyzing a vehicle collision and accident scene based on automobile construction principles through scientific and systematic professional examination, testing and survey means.

At present, generally, the vehicle damage assessment is performed manually using a way that the insurance company staff arrives at a traffic accident scene to perform investigation.

SUMMARY

Embodiments of the present disclosure propose a method and apparatus for generating vehicle damage information.

In a first aspect, some embodiments of the present disclosure provide a method for generating vehicle damage information, including: acquiring a damage area image of a target vehicle; performing image segmentation on the damage area image to obtain a first suspected damage area; inputting the damage area image to a pre-trained detection model to obtain a second suspected damage area, the detection model being configured to detect a location of the suspected damage area in the image; determining a damage image feature based on the first suspected damage area and the second suspected damage area; and inputting the damage image feature to a pre-trained classification model to generate a damage type, the classification model being configured to characterize a corresponding relationship between the image feature and the damage type.

In some embodiments, the determining a damage image feature based on the first suspected damage area and the second suspected damage area, includes: performing image segmentation on the damage area image to obtain a first vehicle component area; determining a first overlapping area formed by the first suspected damage area and the first vehicle component area, and a second overlapping area formed by the second suspected damage area and the first vehicle component area; extracting an image feature of the first overlapping area and an image feature of the second overlapping area; and superimposing the image feature of the first overlapping area and the image feature of the second overlapping area to obtain the damage image feature.

In some embodiments, the extracting an image feature of the first overlapping area and an image feature of the second overlapping area, includes: extracting the image feature of the first overlapping area and the image feature of the second overlapping area by a feature extraction network having a pyramid structure.

In some embodiments, the method further includes: acquiring a damaged component image of the target vehicle; performing image segmentation on the damaged component image to obtain a second vehicle component area; acquiring a coordinate of a predefined vehicle feature point in the damaged component image; establishing, based on the acquired coordinate and a coordinate of the vehicle feature point in a pre-stored three-dimensional model of the vehicle, a mapping relationship between the coordinate of the vehicle feature point in the damaged component image and the coordinate of the vehicle feature point in the three-dimensional model; determining a coordinate of a third overlapping area in a three-dimensional space generated according to the mapping relationship, the third overlapping area being formed by the first suspected damage area and the second vehicle component area; and determining numerical information characterizing a damage degree based on the coordinate of the third overlapping area in the three-dimensional space.

In some embodiments, the method further includes: determining a damage location based on the coordinate of the third overlapping area in the three-dimensional space.

In some embodiments, the method further includes: outputting, according to the determined damage location, damage type, numerical information, and preset corresponding relationships between damage location, damage type, numerical information and vehicle maintenance information, the vehicle maintenance information.

In a second aspect, some embodiments of the present disclosure provide an apparatus for generating vehicle damage information, including: a first acquisition unit, configured to acquire a damage area image of a target vehicle; a first segmentation unit, configured to perform image segmentation on the damage area image to obtain a first suspected damage area; a detection unit, configured to input the damage area image to a pre-trained detection model to obtain a second suspected damage area, the detection model being configured to detect a location of the suspected damage area in the image; a first determining unit, configured to determine a damage image feature based on the first suspected damage area and the second suspected damage area; and a first generation unit, configured to input the damage image feature to a pre-trained classification model to generate a damage type, the classification model being configured to characterize a corresponding relationship between the image feature and the damage type.

In some embodiments, the first determining unit includes: a segmentation subunit, configured to perform image segmentation on the damage area image to obtain a first vehicle component area; a determining subunit, configured to determine a first overlapping area formed by the first suspected damage area and the first vehicle component area, and a second overlapping area formed by the second suspected damage area and the first vehicle component area; an extraction subunit, configured to extract an image feature of the first overlapping area and an image feature of the second overlapping area; and a superimposing subunit, configured to superimpose the image feature of the first overlapping area and the image feature of the second overlapping area to obtain the damage image feature.

In some embodiments, the extraction subunit is further configured to: extract the image feature of the first overlapping area and the image feature of the second overlapping area by a feature extraction network having a pyramid structure.

In some embodiments, the apparatus further includes: a second acquisition unit, configured to acquire a damaged component image of the target vehicle; a second segmentation unit, configured to perform image segmentation on the damaged component image to obtain a second vehicle component area; a third acquisition unit, configured to acquire a coordinate of a predefined vehicle feature point in the damaged component image; an establish acquisition unit, configured to establish, based on the acquired coordinate and a coordinate of the vehicle feature point in a pre-stored three-dimensional model of the vehicle, a mapping relationship between the coordinate of the vehicle feature point in the damaged component image and the coordinate of the vehicle feature point in the three-dimensional model; a second generation unit, configured to determine a coordinate of a third overlapping area in a three-dimensional space generated according to the mapping relationship, the third overlapping area being formed by the first suspected damage area and the second vehicle component area; and a second determining unit, configured to determine numerical information characterizing a damage degree based on the coordinate of the third overlapping area in the three-dimensional space.

In some embodiments, the apparatus further includes: a third determining unit, configured to determine a damage location based on the coordinate of the third overlapping area in the three-dimensional space.

In some embodiments, the apparatus further includes: an output unit, configured to output, according to the determined damage location, damage type, numerical information, and preset corresponding relationships between damage location, damage type, numerical information and vehicle maintenance information, the vehicle maintenance information.

In a third aspect, some embodiments of the present disclosure provide a device, including: one or more processors; and a storage apparatus, storing one or more programs thereon, the one or more programs, when executed by the one or more processors, cause the one or more processors to implement the method in the first aspect.

In a fourth aspect, some embodiments of the present disclosure provide a computer readable medium, storing a computer program thereon, the program, when executed by a processor, implements the method in the first aspect.

In the method and apparatus for generating vehicle damage information provided by the embodiments of the present disclosure, by acquiring a damage area image of a target vehicle; performing image segmentation on the damage area image to obtain a first suspected damage area; inputting the damage area image to a pre-trained detection model to obtain a second suspected damage area, the detection model being configured to detect a location of the suspected damage area in the image; determining a damage image feature based on the first suspected damage area and the second suspected damage area; and inputting the damage image feature to a pre-trained classification model to generate a damage type, the classification model being configured to characterize a corresponding relationship between the image feature and the damage type, a damage type determination mechanism combining image segmentation results and image detection results is provided, improving a vehicle damage assessment efficiency.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
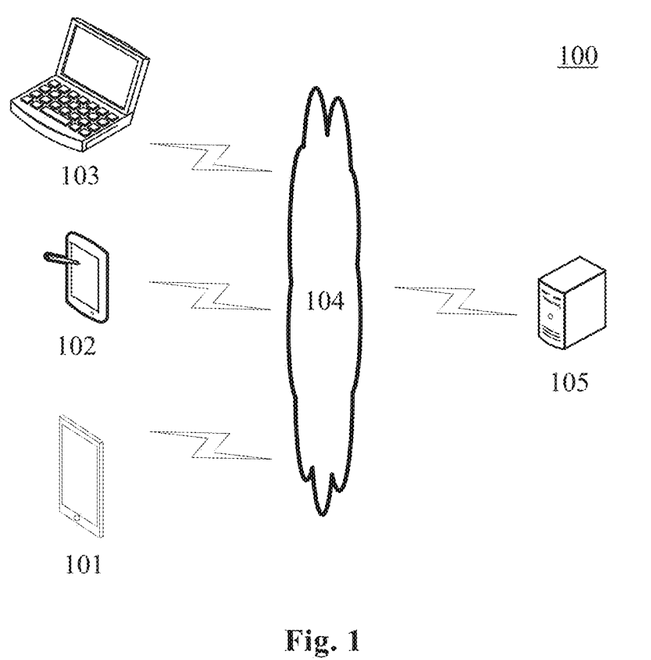
FIG. 1 is an example system architecture diagram to which some embodiments of the present disclosure may be applied.

FIG. 1 illustrates an example system architecture 100 of a method for generating vehicle damage information or an apparatus for generating vehicle damage information to which some embodiments of the present disclosure may be applied.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may interact with the server 105 through the network 104 using the terminal devices 101, 102, 103 to receive or transmit messages and the like. Various client applications, such as image acquisition applications, image processing applications, vehicle insurance applications, or search applications, may be installed on the terminal devices 101, 102, and 103.

The terminal devices 101, 102, 103 may be hardware or software. When being hardware, the terminal devices 101, 102, 103 may be various electronic devices having display screens, including but not limited to smart phones, tablets, laptop portable computers, desktop computers, and the like. When being software, the terminal devices 101, 102, 103 may be installed in the above-listed electronic devices. The terminal devices 101, 102, 103 may be implemented as a plurality of software or software modules (for example, for providing image acquisition services or liveness detection services) or as a single software or software module, which is not specifically limited herein.

The server 105 may be a server that provides various services, such as a background server that provides support for the applications installed in the terminal devices 101, 102, 103. The server 105 may acquire a damage area image of a target vehicle; perform image segmentation on the damage area image to obtain a first suspected damage area; input the damage area image to a pre-trained detection model to obtain a second suspected damage area, the detection model being configured to detect a location of the suspected damage area in the image; determine a damage image feature based on the first suspected damage area and the second suspected damage area; and input the damage image feature to a pre-trained classification model to generate a damage type, the classification model being configured to characterize a corresponding relationship between the image feature and the damage type.

It should be noted that the method for generating vehicle damage information provided by the embodiments of the present disclosure may be performed by the server 105, or may be performed by the terminal devices 101, 102, 103. Accordingly, the apparatus for generating vehicle damage information may be disposed in the server 105, or may be disposed in the terminal devices 101, 102, 103.

It should be noted that the server may be hardware or software. When being hardware, the server may be implemented as a distributed server cluster composed of multiple servers, or may be implemented as a single server. When being software, the server may be implemented as a plurality of software or software modules (for example, for providing distributed services), or as a single software or software module, which is not specifically limited herein.

It should be understood that the number of terminal devices, networks, and servers in FIG. 1 is merely illustrative. Depending on the implementation needs, there may be any number of terminal devices, networks, and servers.

Figure 2:
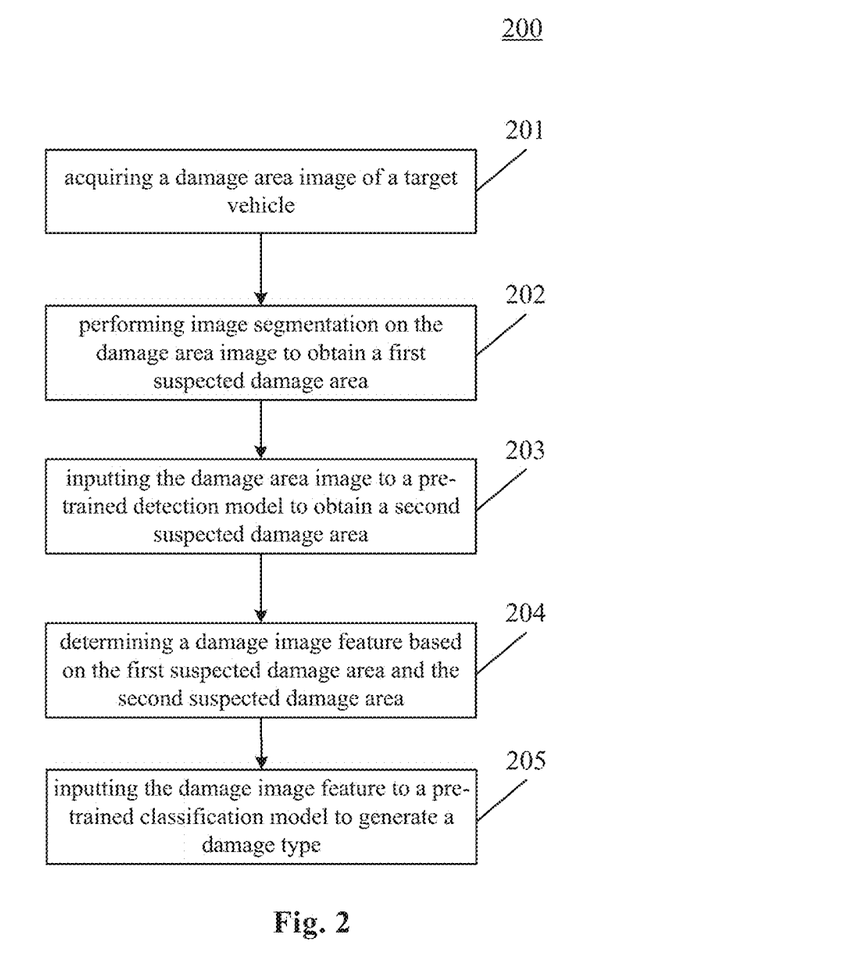
FIG. 2 is a flowchart of a method for generating vehicle damage information according to some embodiments of the present disclosure.

With further reference to FIG. 2, a flow 200 of a method for generating vehicle damage information according to some embodiments of the present disclosure is illustrated. The method for generating vehicle damage information includes the following steps 201 to 205.

Step 201, acquiring a damage area image of a target vehicle.

In the present embodiment, an executing body of the method for generating vehicle damage information (for example, the server or terminal shown in FIG. 1) may first acquire the damage area image of the target vehicle.

In the present embodiment, the executing body may acquire the damage area image using a plurality of methods, for example, acquiring the damage area image voluntarily uploaded by a user or an insurance company through the client, or acquiring the damage area image by connecting to a specific data storage server (such as the server of the insurance company). The damage area image may be a captured original image, or an image obtained after an operation such as preprocessing or classification.

As an example, the preprocessing may include enlarging or shrinking the image, cropping the image, rotating the image, subtracting the RGB value of a pixel point in the image by a preset RGB mean value, graying the image, or performing a homography transformation on the image through a predetermined feature point, or the like.

Here, the damage area image may be captured at a preset shooting angle, and have a complete damage area located in a preset area, for example, the image is captured against the damage area, and has the complete and visible damage area located in the center of the image and within one-third of the area range of the image. Thereby, the efficiency of subsequent image processing steps may be improved.

Step 202, performing image segmentation on the damage area image to obtain a first suspected damage area.

In the present embodiment, the execution body may perform image segmentation on the damage area image acquired in step 201 to obtain the first suspected damage area. The executing body may perform image segmentation on the damage area image by using some image processing methods.

As an example, an image distinctiveness testing may be performed on a to-be-recognized image to acquire the distinctive area of the image. The smallest rectangular area including the distinctive area is the first suspected damage area. In practice, the first suspected damage area and the background area in the damage area image have different features, and the feature difference is large, therefore, the first suspected damage area may be quickly determined by the image distinctiveness testing.

As another example, an image segmentation model may be constructed based on a convolutional neural network (CNN) and a region proposal network (RPN) in combination with a pooling layer, a fully connected layer, and the like. For example, various models and variants based on the convolutional neural network and the region proposal network, such as Faster R-CNN, or YOLO, may be used. The convolutional neural network (CNN) may use any CNN model, such as ResNet, Inception, VGG, and its variants. Fast R-CNN, YOLO, Mask-FCN, etc. are all deep neural networks including convolution layers that may be used by the image segmentation model. The image segmentation model may be obtained by training using sample images labelled with damage areas.

Step 203, inputting the damage area image to a pre-trained detection model to obtain a second suspected damage area.

In the present embodiment, the executing body may input the damage area image acquired in step 201 to the pre-trained detection model to obtain the second suspected damage area. Here, the detection model is configured to detect the location of the suspected damage area in the image. A detection result may include location information of the second suspected damage area, a probability that each pixel in the image is included in the second suspected damage area, and a confidence that an area in the image is the second suspected damage area, or the like.

As an example, the detection model may be a corresponding relationship table storing the plurality of sample images and the location information of the suspected damage areas in the sample images, obtained by performing statistical analysis on a large number of sample images and location information of suspected damage areas in the sample images by those skilled in the art. In this case, the executing body may calculate the similarity between the damage area image and each sample image in the corresponding relationship table, and obtain the suspected damage area detection result corresponding to the damage area image from the corresponding relationship table based on a similarity calculation result. For example, first, a sample image having the highest similarity with the damage area image is determined, and then the location information of the second suspected damage area in the sample image is found from the corresponding relationship table as the second suspected damage area detection result corresponding to the damage area image.

As another example, the detection model may alternatively be obtained by supervised training of an existing machine learning model using machine learning methods and training samples. For example, a model such as a full convolutional network model may be used. Compared with a conventional convolutional neural network model, the full convolutional network model eliminates the fully connected layer in the network structure, greatly reduces the parameters of the model, and transforms the image segmentation into a pixel-wise prediction problem by upsampling, saving computation time compared to the conventional patch-wise approach.

Here, the detection model may include a feature extraction network having a pyramid structure. The feature extraction network having the pyramid structure may be a feature pyramid network (FPN) or other feature extraction network that fuses the outputs of different depth feature extraction layers (such as the convolution layer), and the feature pyramid may be used to detect objects of different scales and improve the accuracy of model output. The detection model may be obtained by training as: acquiring a training sample set, where a training sample includes a sample image and a second suspected damage area labeling result corresponding to the sample image; and using sample images of training samples in the training sample set as input, and using labeling results corresponding to the input sample images as output, to perform training to obtain the detection model. Alternatively, the training sample set may include multi-scale training samples to improve the detection accuracy of the model for targets of different sizes.

In some implementations, the using sample images of training samples in the training sample set as input, using labeling results corresponding to the input sample images as output, to perform training to obtain the detection model may include the following three steps.

First step includes acquiring a training sample in the training sample set, and inputting a sample image corresponding to the training sample to the detection model, to obtain a detection result corresponding to the training sample.

As an example, for an untrained multi-layer convolutional neural network, its various network parameters (e.g., weight value parameters and offset parameters) are initialized with different small random numbers. The "small random numbers" are used to ensure that the network does not enter saturation due to excessive weight value, which leads to training failure. "Different" is used to ensure that the network can learn normally. For a multi-layer convolutional neural network whose training is not finished, its various network parameters may be adjusted network parameters, but the recognition effect of the multi-layer convolutional neural network does not satisfy a preset constraint condition.

Second step includes determining a difference between the detection result of the sample image corresponding to the training sample and an image type labeling result of the sample image corresponding to the training sample.

Here, the electronic device may use various loss functions to determine the difference, and the method for determining the difference using the loss functions is a well-known technique widely studied and applied at present, and detailed description thereof will be omitted.

Third step includes adjusting parameters of the detection model based on the determined difference.

Here, the parameters of the detection model may be adjusted based on the difference using various implementations. For example, the BP (Back Propagation) algorithm or the SGD (Stochastic Gradient Descent) algorithm may be used to adjust the parameters of the detection model. In practice, after each training sample in the training sample set performs the above training steps or the recognition effect of the detection model satisfies the preset constraint condition, the training of the detection model is completed.

Step 204, determining a damage image feature based on the first suspected damage area and the second suspected damage area.

In the present embodiment, the executing body may determine the damage image feature based on the first suspected damage area obtained in step 202 and the second suspected damage area obtained in step 203. The executing body may superimpose the first suspected damage area and the second suspected damage area image, and then perform feature extraction on the superimposed image, or may extract the image features of the first suspected damage area and the image features of the second suspected damage area respectively, and then superimpose the extracted image features.

Step 205, inputting the damage image feature to a pre-trained classification model to generate a damage type.

In the present embodiment, the executing body may input the damage image feature determined in step 204 to the pre-trained classification model to generate the damage type. The classification model is configured to characterize a corresponding relationship between the image feature and the damage type. The damage type may include a scratch, depression, hole, or the like.

As an example, the classification model may be a corresponding relationship table storing the plurality of sample image features and the damage types, obtained by performing statistical analysis on a large number of sample image features and damage types of the sample images by those skilled in the art. In this case, the execution body may calculate the similarity between the damage image feature and each sample image feature in the corresponding relationship table, and obtain the damage type corresponding to the damage image feature from the corresponding relationship table based on a similarity calculation result. For example, first, a sample image feature having the highest similarity with the damage image feature is determined, and then the damage type of the sample image feature is found from the corresponding relationship table as the damage type corresponding to the damage image feature.

As another example, the classification model may alternatively be obtained by supervised training of an existing machine learning model using machine learning methods and training samples. For example, the sample image feature may be used as an input, and the damage type of the sample image may be used as an output to train an initial naive Bayesian model (NBM) or a model for classification such as the support vector machine (SVM), to obtain the classification model in the present embodiment.

In some alternative implementations of the present embodiment, the method further includes: acquiring a damaged component image of the target vehicle; performing image segmentation on the damaged component image to obtain a second vehicle component area; acquiring a coordinate of a predefined vehicle feature point in the damaged component image; establishing, based on the acquired coordinate and a coordinate of the vehicle feature point in a pre-stored three-dimensional model of the vehicle, a mapping relationship between the coordinate of the vehicle feature point in the damaged component image and the coordinate of the vehicle feature point in the three-dimensional model; determining a coordinate of a third overlapping area in a three-dimensional space generated according to the mapping relationship, the third overlapping area being formed by the first suspected damage area and the second vehicle component area; and determining numerical information characterizing a damage degree based on the coordinate of the third overlapping area in the three-dimensional space.

In the present implementation, the damaged component image may include an image captured at a preset shooting angle, having a complete damaged component located in a preset area, for example, an image captured against the damaged component, having the complete and visible damaged component located in the center of the image and within two-third of the area range of the image. Thereby, the efficiency of subsequent image processing steps may be improved. The predefined vehicle feature point may include a point having distinct texture feature and structural feature between different components on the outer surface of the vehicle body, which may be specifically set according to actual needs. The above mapping relationship may be implemented based on homography transformation or other approaches. The numerical information characterizing a damage degree may be values of area, length, and width of the obtained third overlapping area, or other values indicating whether the degree is serious.

In some alternative implementations of the present embodiment, the method further includes: determining a damage location based on the coordinate of the third overlapping area in the three-dimensional space. The damage location may be characterized by the damaged component, for example, the damage is located at the front left door, the rear right door. In addition, the damage location may alternatively be determined based on the component type identified by the segmented vehicle component areas.

In some alternative implementations of the present embodiment, the method further includes: outputting, according to the determined damage location, damage type, numerical information, and preset corresponding relationships between damage location, damage type, numerical information and vehicle maintenance information. The vehicle maintenance information may include a vehicle maintenance method, such as touch-up painting, replacing components, and may also include maintenance costs, maintenance work hours, and the like. The corresponding relationships between the damage location, the damage type, the numerical information and the vehicle maintenance information may be set according to the actual situations of the areas.

In the method provided by the above embodiment of the present disclosure, by acquiring a damage area image of a target vehicle; performing image segmentation on the damage area image to obtain a first suspected damage area; inputting the damage area image to a pre-trained detection model to obtain a second suspected damage area, the detection model being configured to detect a location of the suspected damage area in the image; determining a damage image feature based on the first suspected damage area and the second suspected damage area; and inputting the damage image feature to a pre-trained classification model to generate a damage type, the classification model being configured to characterize a corresponding relationship between the image feature and the damage type, a damage type determination mechanism combining image segmentation results and image detection results, improving a vehicle damage assessment efficiency.

Figure 3:
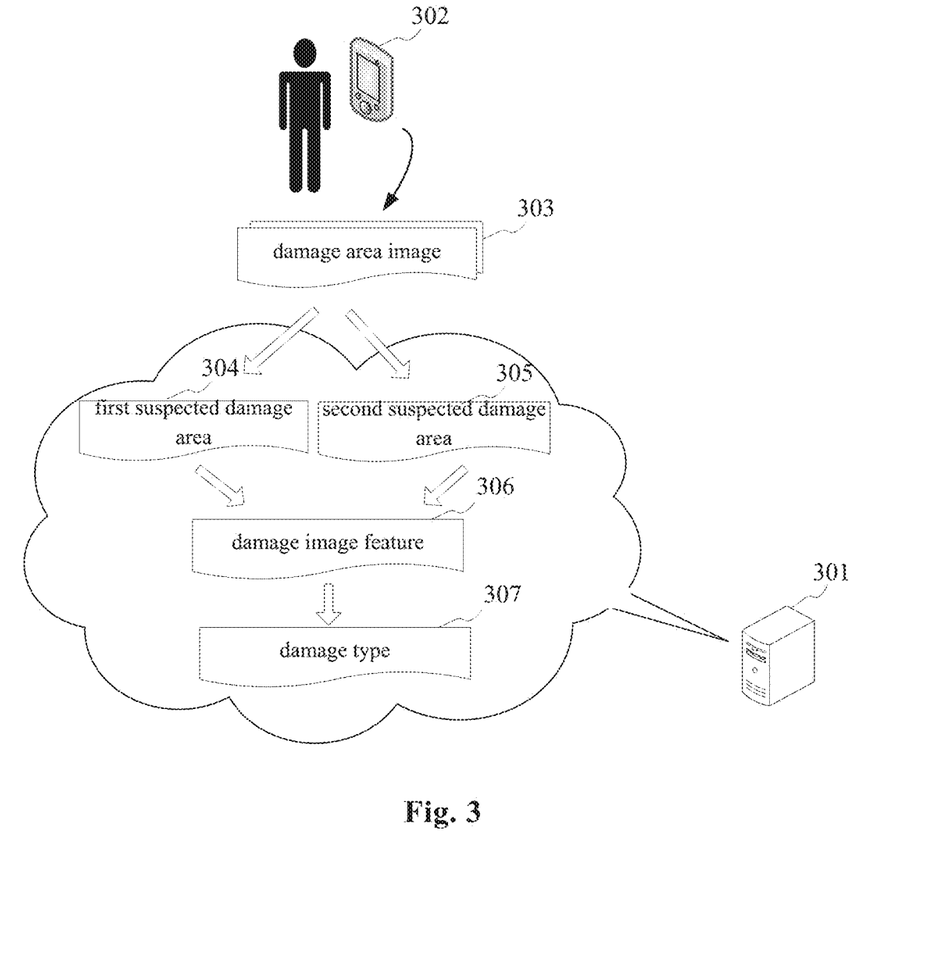
FIG. 3 is a schematic diagram of an application scenario of the method for generating vehicle damage information according to some embodiments of the present disclosure.

With further reference to FIG. 3, FIG. 3 is a schematic diagram of an application scenario of the method for generating vehicle damage information according to the present embodiment. In the application scenario of FIG. 3, a server 301 acquires a damage area image 303 of a target vehicle uploaded by a user through a terminal 302; performs image segmentation on the damage area image to obtain a first suspected damage area 304; inputs the damage area image to a pre-trained detection model to obtain a second suspected damage area 305, where the detection model is configured to detect the location of the suspected damage area in the image; determines a damage image feature 306 based on the first suspected damage area and the second suspected damage area; and inputs the damage image feature to a pre-trained classification model to generate a damage type 307, where the classification model is configured to characterize a corresponding relationship between the image feature and the damage type.

Figure 4:
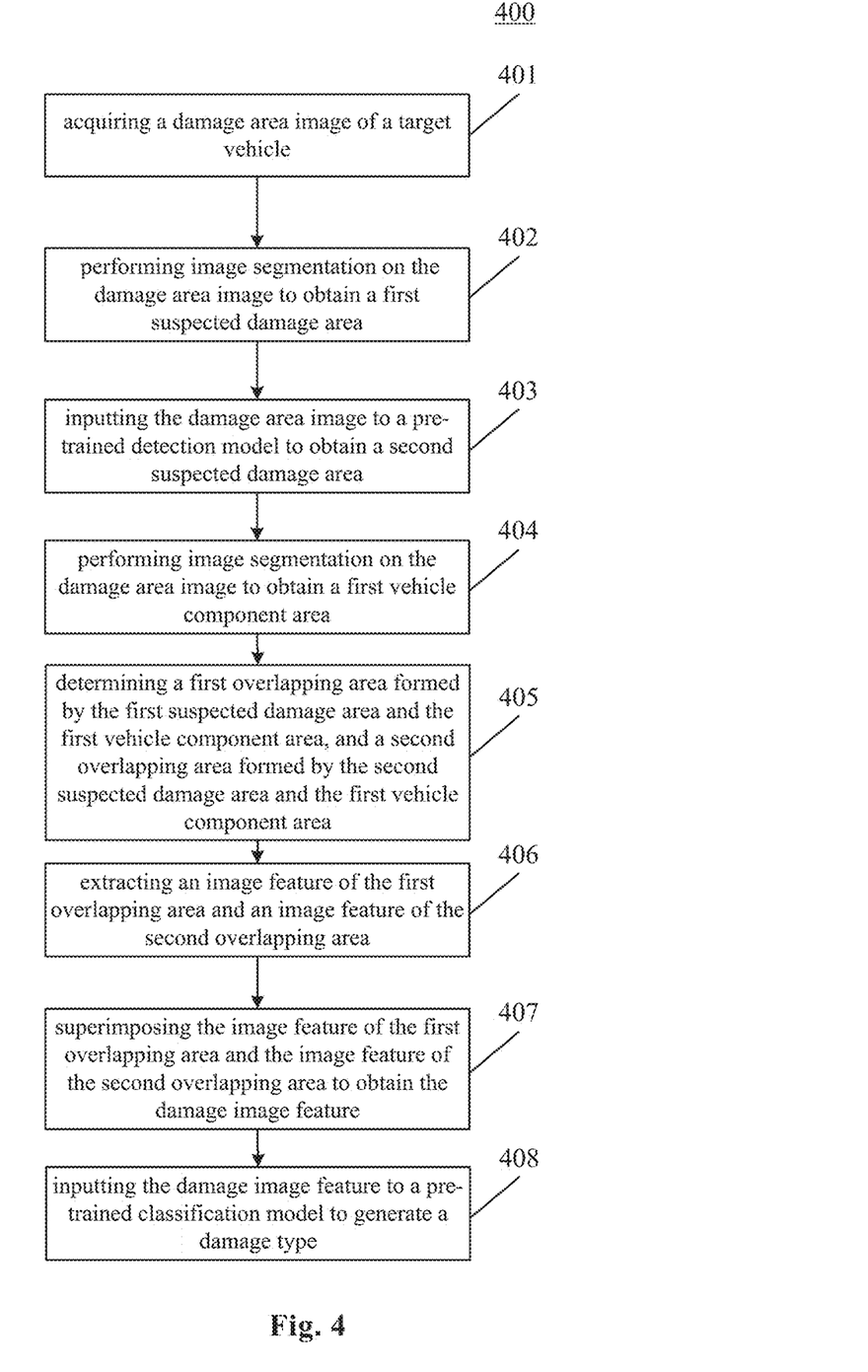
FIG. 4 is a flowchart of the method for generating vehicle damage information according to other embodiments of the present disclosure.

With further reference to FIG. 4, a flow 400 of another embodiment of the method for generating vehicle damage information is illustrated. The flow 400 of the method for generating vehicle damage information includes the following steps 401 to 408.

Step 401, acquiring a damage area image of a target vehicle.

In the present embodiment, an executing body of the method for generating vehicle damage information (for example, the server or terminal shown in FIG. 1) may first acquire the damage area image of the target vehicle.

Step 402, performing image segmentation on the damage area image to obtain a first suspected damage area.

In the present embodiment, the execution body may perform image segmentation on the damage area image acquired in step 401 to obtain the first suspected damage area. The executing body may perform image segmentation on the damage area image by using some image processing methods.

Step 403, inputting the damage area image to a pre-trained detection model to obtain a second suspected damage area.

In the present embodiment, the executing body may input the damage area image acquired in step 401 to the pre-trained detection model to obtain the second suspected damage area. Here, the detection model is configured to detect the location of the suspected damage area in the image.

Step 404, performing image segmentation on the damage area image to obtain a first vehicle component area.

In the present embodiment, the executing body may perform image segmentation on the damage area image acquired in step 401 to obtain the first vehicle component area. Image segmentation may be based on a preset vehicle feature point, or an image segmentation model may be constructed based on a convolutional neural network (CNN) and a region proposal network (RPN) in combination with a pooling layer, a fully connected layer, and the like. For example, various models and variants based on the convolutional neural network and the region proposal network, such as Faster R-CNN, or YOLO, may be used. The convolutional neural network (CNN) may use any CNN model, such as ResNet, Inception, VGG, and its variants. Fast R-CNN, YOLO, Mask-FCN, etc. are all deep neural networks including convolution layers that may be used by the image segmentation model. The image segmentation model may be obtained by training using sample images labelled with vehicle component areas.

Step 405, determining a first overlapping area formed by the first suspected damage area and the first vehicle component area, and a second overlapping area formed by the second suspected damage area and the first vehicle component area.

In the present embodiment, the executing body may determine the first overlapping area formed by the first suspected damage area obtained in step 402 and the first vehicle component area obtained in step 404, and the second overlapping area formed by the second suspected damage area obtained in step 403 and the first vehicle component area obtained in step 404.

Step 406, extracting an image feature of the first overlapping area and an image feature of the second overlapping area.

In the present embodiment, the executing body may extract the image feature of the first overlapping area determined in step 405 and the image feature of the second overlapping area determined in step 405. The executing body may extract the image features based on an active shape model (ASM), a principal component analysis (PCA) model, an independent component analysis (ICA) model, and a linear discriminant analysis (LDA) model, a local feature analysis (LFA) model, a local binary pattern (LBP), and a convolutional neural network, or the like.

Step 407, superimposing the image feature of the first overlapping area and the image feature of the second overlapping area to obtain the damage image feature.

In the present embodiment, the executing body may superimpose the image feature of the first overlapping area and the image feature of the second overlapping area extracted in step 406 to obtain the damage image feature. The superimposition may be performed according to a preset weight, and the specific weight may be set according to actual needs. For example, the image feature of the first overlapping area has a weight of 0.6, and the image feature of the second overlapping area has a weight of 0.4.

Step 408, inputting the damage image feature to a pre-trained classification model to generate a damage type.

In the present embodiment, the executing body may input the damage image feature determined in step 404 to the pre-trained classification model to generate the damage type.

In the present embodiment, the operations of the step 401, the step 402, the step 403, and the step 408 are substantially the same as the operations of the step 201, the step 202, the step 203, and the step 205, and detailed description thereof will be omitted.

As can be seen from FIG. 4, compared with the embodiment corresponding to FIG. 2, in the flow 400 of the method for generating vehicle damage information in the present embodiment, by determining the overlapping areas formed by the suspected damage areas and the vehicle component area, obtaining the damage image feature from the overlapping areas, the solution described in the present embodiment avoids interference from images of areas not including vehicle components, and further improves the accuracy of the vehicle damage assessment.

Figure 5:
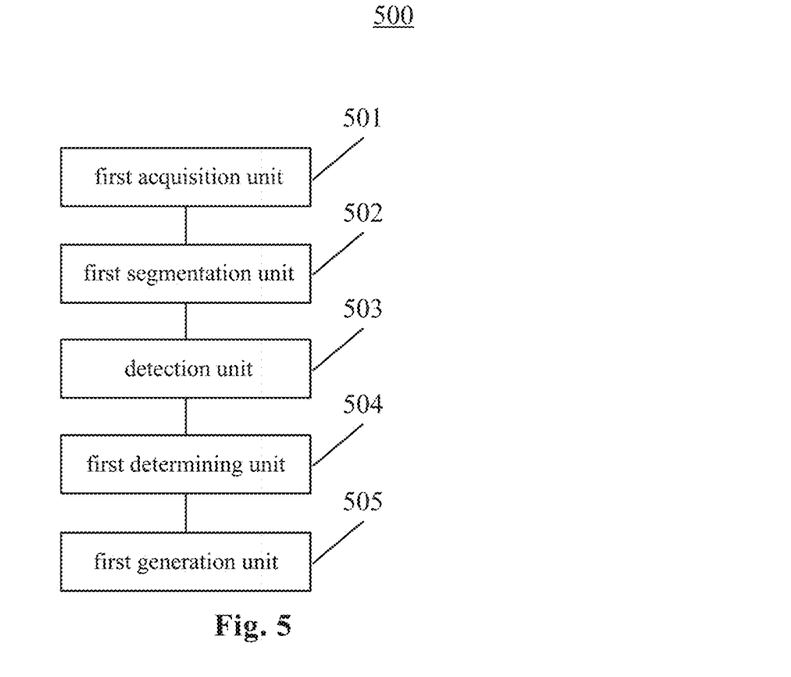
FIG. 5 is a schematic structural diagram of an apparatus for generating vehicle damage information according to some embodiments of the present disclosure.

With further reference to FIG. 5, as an implementation of the method shown in the above figures, the present disclosure provides an embodiment of an apparatus for generating vehicle damage information, and the apparatus embodiment corresponds to the method embodiment as shown in FIG. 2, and the apparatus may be specifically applied to various electronic devices.

As shown in FIG. 5, the apparatus 500 for generating vehicle damage information of the present embodiment includes: a first acquisition unit 501, a first segmentation unit 502, a detection unit 503, a first determining unit 504 and a first generation unit 505. The first acquisition unit is configured to acquire a damage area image of a target vehicle. The first segmentation unit is configured to perform image segmentation on the damage area image to obtain a first suspected damage area. The detection unit is configured to input the damage area image to a pre-trained detection model to obtain a second suspected damage area, the detection model being configured to detect a location of a suspected damage area in the image. The first determining unit is configured to determine a damage image feature based on the first suspected damage area and the second suspected damage area. The first generation unit is configured to input the damage image feature to a pre-trained classification model to generate a damage type, the classification model being configured to characterize a corresponding relationship between the image feature and the damage type.

In the present embodiment, the specific processing of the first acquisition unit 501, the first segmentation unit 502, the detection unit 503, the first determining unit 504 and the first generation unit 505 of the apparatus 500 for generating vehicle damage information may refer to step 201, step 202, step 203, step 204 and step 205 in the embodiment corresponding to FIG. 2.

In some alternative implementations of the present embodiment, the first determining unit includes: a segmentation subunit, configured to perform image segmentation on the damage area image to obtain a first vehicle component area; a determining subunit, configured to determine a first overlapping area formed by the first suspected damage area and the first vehicle component area, and a second overlapping area formed by the second suspected damage area and the first vehicle component area; an extraction subunit, configured to extract an image feature of the first overlapping area and an image feature of the second overlapping area; and a superimposing subunit, configured to superimpose the image feature of the first overlapping area and the image feature of the second overlapping area to obtain the damage image feature.

In some alternative implementations of the present embodiment, the extraction subunit is further configured to: extract the image feature of the first overlapping area and the image feature of the second overlapping area by a feature extraction network having a pyramid structure.

In some alternative implementations of the present embodiment, the apparatus further includes: a second acquisition unit, configured to acquire a damaged component image of the target vehicle; a second segmentation unit, configured to perform image segmentation on the damaged component image to obtain a second vehicle component area; a third acquisition unit, configured to acquire a coordinate of a predefined vehicle feature point in the damaged component image; an establish acquisition unit, configured to establish, based on the acquired coordinate and a coordinate of the vehicle feature point in a pre-stored three-dimensional model of the vehicle, a mapping relationship between the coordinate of the vehicle feature point in the damaged component image and the coordinate of the vehicle feature point in the three-dimensional model; a second generation unit, configured to determine a coordinate of a third overlapping area in a three-dimensional space generated according to the mapping relationship, the third overlapping are being formed by the first suspected damage area and the second vehicle component area; and a second determining unit, configured to determine numerical information characterizing a damage degree based on the coordinate of the third overlapping area in the three-dimensional space.

In some alternative implementations of the present embodiment, the apparatus further includes: a third determining unit, configured to determine a damage location based on the coordinate of the third overlapping area in the three-dimensional space.

In some alternative implementations of the present embodiment, the apparatus further includes: an output unit, configured to output, according to the determined damage location, damage type and numerical information, and preset corresponding relationships between damage location, damage type, numerical information and vehicle maintenance information, the vehicle maintenance information.

For the apparatus provided by the above embodiment of the present disclosure, by acquiring a damage area image of a target vehicle; performing image segmentation on the damage area image to obtain a first suspected damage area; inputting the damage area image to a pre-trained detection model to obtain a second suspected damage area, the detection model being configured to detect a location of the suspected damage area in the image; determining a damage image feature based on the first suspected damage area and the second suspected damage area; and inputting the damage image feature to a pre-trained classification model to generate a damage type, the classification model being configured to characterize a corresponding relationship between the image feature and the damage type, a damage type determination mechanism combining image segmentation results and image detection results is provided, improving a vehicle damage assessment efficiency.

Figure 6:
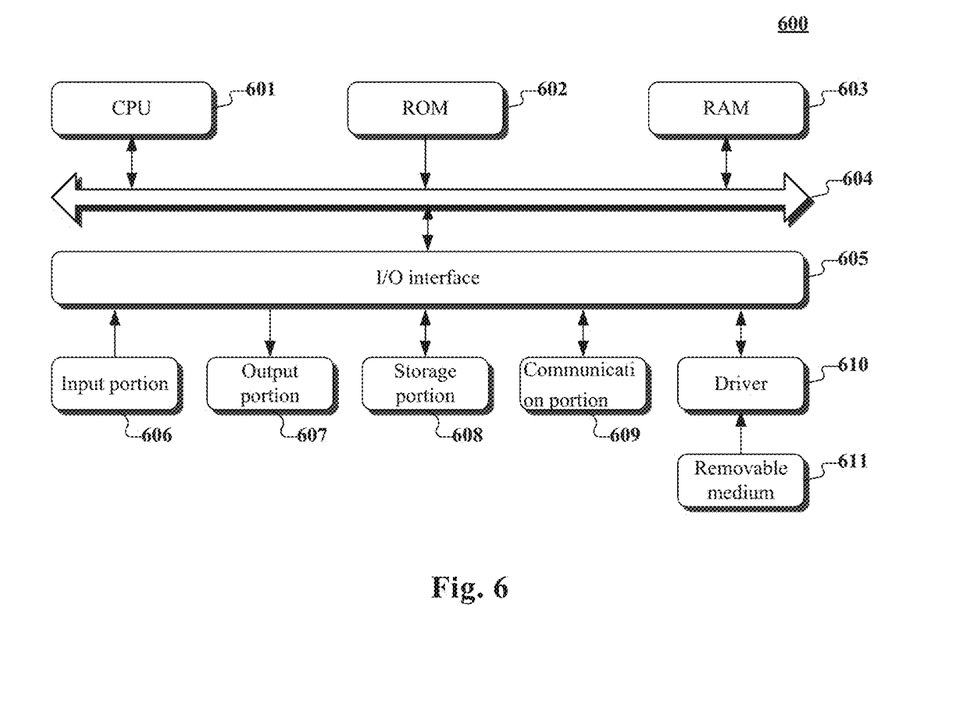
FIG. 6 is a schematic structural diagram of a computer system adapted to implement a server or a terminal of some embodiments of the present disclosure.

With further reference to FIG. 6, a schematic structural diagram of a computer system 600 adapted to implement a server or a terminal of the embodiments of the present disclosure is shown. The server or terminal shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components may be connected to the I/O interface 605: an input portion 606 including such as a keyboard, a mouse; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer readable storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a first acquisition unit, a first segmentation unit, a detection unit, a first determining unit and a first generation unit. Here, the names of these units do not in some cases constitute limitations to such units themselves. For example, the first acquisition unit may also be described as "a unit configured to acquire a damage area image of a target vehicle".

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: acquire a damage area image of a target vehicle; perform image segmentation on the damage area image to obtain a first suspected damage area; input the damage area image to a pre-trained detection model to obtain a second suspected damage area, the detection model being configured to detect a location of a suspected damage area in the image; determine a damage image feature based on the first suspected damage area and the second suspected damage area; and input the damage image feature to a pre-trained classification model to generate a damage type, the classification model being configured to characterize a corresponding relationship between the image feature and the damage type.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating vehicle damage information, the method comprising:
    acquiring a given damage area image of a target vehicle, the damage area image including a given damage area, wherein the given damage area is a complete damage area located in a center of the given damage area image and within one-third of an area range of the given damage area image;
    performing a first damage image segmentation on the given damage area image to obtain a first suspected damage area of the given damage area;
    performing a second damage image segmentation on the given damage area image to obtain a second suspected damage area of the given damage area, the second damage image segmentation being different from the first damage image segmentation;
    determining a damage image feature based on the first suspected damage area and the second suspected damage area; and
    inputting the damage image feature to a pre-trained classification model to generate a damage type, the classification model being configured to characterize a corresponding relationship between the image feature and the damage type;
    wherein the determining a damage image feature based on the first suspected damage area and the second suspected damage area, comprises:
    performing a first vehicle image segmentation on the given damage area image to obtain a given first vehicle component area;
    determining a first overlapping area formed by the first suspected damage area and the given first vehicle component area, and a second overlapping area formed by the second suspected damage area and the given first vehicle component area;
    extracting a first image feature of the first overlapping area a second image feature of the second overlapping area;
    and superimposing the first image feature of the first overlapping area with the second image feature of the second overlapping area to obtain the damage image feature.

2. The method according to claim 1, wherein the extracting a first image feature of the first overlapping area and a second image feature of the second overlapping area, comprises:
    extracting the first image feature of the first overlapping area and the second image feature of the second overlapping area by a feature extraction network having a pyramid structure.

3. The method according to claim 1, wherein the method further comprises:
    acquiring a damaged component image of the target vehicle;
    performing a second vehicle image segmentation on the damaged component image to obtain a second vehicle component area;
    acquiring a coordinate of a predefined vehicle feature point in the damaged component image;
    establishing, based on the acquired coordinate and a coordinate of the vehicle feature point in a pre-stored three-dimensional model of the vehicle, a mapping relationship between the coordinate of the vehicle feature point in the damaged component image and the coordinate of the vehicle feature point in the three-dimensional model;

determining a coordinate of a third overlapping area in a three-dimensional space, the coordinate being generated according to the mapping relationship, and the third overlapping area being formed by the first suspected damage area and the second vehicle component area; and determining numerical information characterizing a damage degree based on the coordinate of the third overlapping area in the three-dimensional space.

4. The method according to claim 3, wherein the method further comprises:

determining a damage location based on the coordinate of the third overlapping area in the three-dimensional space.

5. The method according to claim 4, wherein the method further comprises:

outputting, according to the determined damage location, damage type, numerical information, and preset corresponding relationships between damage location, damage type, numerical information and vehicle maintenance information, the vehicle maintenance information.

6. The method according to claim 1, wherein the first damage image segmentation is performed based on an image distinctiveness testing, and the second damage image segmentation is a pre-trained detection model, the detection model being configured to detect a location of the suspected damage area in the image.

7. The method according to claim 1, wherein the first damage image segmentation is performed based on a convolutional neural network and a region proposal network in combination with a pooling layer, and the second damage image segmentation is performed based on a corresponding relationship table storing a plurality of sample images and location information of suspected damage areas in the sample images.

8. The method according to claim 1, wherein the first vehicle image segmentation is performed based on a preset vehicle feature point, wherein the preset vehicle feature point includes a point having distinct texture feature and structure feature between different components on an outer surface of a vehicle body.

9. An apparatus for generating vehicle damage information, the apparatus comprising:

at least one processor; and a memory storing instructions, wherein the instructions when executed by the at least one processor, cause the at least one processor to perform operations, the operations comprising:

acquiring a given damage area image of a target vehicle, the damage area image including a given damage area, located in a center of the given damage area image and within one-third of an area range of the given damage area image;

performing a first damage image segmentation on the given damage area image to obtain a first suspected damage area of the given damage area;

performing a second damage image segmentation on the given damage area image to obtain a second suspected damage area of the given damage area, the second damage image segmentation being different from the first damage image segmentation;

determining a damage image feature based on the first suspected damage area and the second suspected damage area; and inputting the damage image feature to a pre-trained classification model to generate a damage type, the classification model being configured to characterize a corresponding relationship between the image feature and the damage type;

wherein the determining a damage image feature based on the first suspected damage area and the second suspected damage area, comprises:

performing a first vehicle image segmentation on the given damage area image to obtain a given first vehicle component area;

determining a first overlapping area formed by the first suspected damage area and the given first vehicle component area, and a second overlapping area formed by the second suspected damage area and the given first vehicle component area;

extracting a first image feature of the first overlapping area a second image feature of the second overlapping area;

and superimposing the first image feature of the first overlapping area with the second image feature of the second overlapping area to obtain the damage image feature.

10. The apparatus according to claim 9, wherein the extracting a first image feature of the first overlapping area and a second image feature of the second overlapping area, comprises:

extracting the first image feature of the first overlapping area and the second image feature of the second overlapping area by a feature extraction network having a pyramid structure.

11. The apparatus according to claim 9, wherein the operations further comprise:

acquiring a damaged component image of the target vehicle;

performing a second vehicle image segmentation on the damaged component image to obtain a second vehicle component area;

acquiring a coordinate of a predefined vehicle feature point in the damaged component image;

establishing, based on the acquired coordinate and a coordinate of the vehicle feature point in a pre-stored three-dimensional model of the vehicle, a mapping relationship between the coordinate of the vehicle feature point in the damaged component image and the coordinate of the vehicle feature point in the three-dimensional model;

determining a coordinate of a third overlapping area in a three-dimensional space generated according to the mapping relationship, the third overlapping area being formed by the first suspected damage area and the second vehicle component area; and determining numerical information characterizing a damage degree based on the coordinate of the third overlapping area in the three-dimensional space.

12. The apparatus according to claim 11, wherein the operations further comprise:

determining a damage location based on the coordinate of the third overlapping area in the three-dimensional space.

13. The apparatus according to claim 12, wherein the operations further comprise:

outputting, according to the determined damage location, damage type, numerical information, and preset corresponding relationships between damage location, damage type, numerical information and vehicle maintenance information, the vehicle maintenance information.

14. A non-transitory computer readable medium, storing a computer program thereon, the program, when executed by a processor, causes the processor to perform operations, the operations comprising:

acquiring a given damage area image of a target vehicle, the damage area image including a given damage area, wherein the given damage area is a complete damage area located in a center of the given damage area image and within one-third of an area range of teh given damage area image;

performing a first damage image segmentation on the given damage area image to obtain a first suspected damage area of the given damage area;

performing a second damage image segmentation on the given damage area image to obtain a second suspected damage area of the given damage area, the second damage image segmentation being different from the first damage image segmentation;

determining a damage image feature based on the first suspected damage area and the second suspected damage area;

and inputting the damage image feature to a pre-trained classification model to generate a damage type, the classification model being configured to characterize a corresponding relationship between the image feature and the damage type;

wherein the determining a damage image feature based on the first suspected damage area and the second suspected damage area, comprises:

performing a first vehicle image segmentation on the given damage area image to obtain a given first vehicle component area;

determining a first overlapping area formed by the first suspected damage area and the given first vehicle component area, and a second overlapping area formed by the second suspected damage area and the given first vehicle component area;

extracting a first image feature of the first overlapping area a second image feature of the second overlapping area;

and superimposing the first image feature of the first overlapping area with the second image feature of the second overlapping area to obtain the damage image feature.

* * * * *